(12) United States Patent
Tamersoy et al.

(10) Patent No.: US 10,530,805 B1
(45) Date of Patent: Jan. 7, 2020

(54) SYSTEMS AND METHODS FOR DETECTING SECURITY INCIDENTS

(71) Applicant: Symantec Corporation, Mountain View, CA (US)

(72) Inventors: Acar Tamersoy, Culver City, CA (US); Kevin Roundy, Culver City, CA (US); Michael Hart, Culver City, CA (US); Daniel Kats, Culver City, CA (US); Michael Spertus, Chicago, IL (US)

(73) Assignee: Symantec Corporation, Mountain View, CA (US)

( * ) Notice: Subject to any disclaimer, the term of this patent is extended or adjusted under 35 U.S.C. 154(b) by 184 days.

(21) Appl. No.: 15/679,131

(22) Filed: Aug. 16, 2017

(51) Int. Cl.
*H04L 29/06* (2006.01)
(52) U.S. Cl.
CPC ...... *H04L 63/1441* (2013.01); *H04L 63/1425* (2013.01)
(58) Field of Classification Search
CPC ............ H04L 63/1441; H04L 63/1425; H04L 63/1433; H04L 63/1416; H04L 41/12; H04L 41/142; H04L 63/1408; G06F 21/55; G06F 21/577; G06F 21/554; G06F 21/552; G06F 21/566
See application file for complete search history.

(56) References Cited

U.S. PATENT DOCUMENTS

2009/0089285 A1\* 4/2009 Donato .................. H04L 51/12
2017/0063909 A1\* 3/2017 Muddu ................ G06F 16/254

\* cited by examiner

*Primary Examiner* — Yogesh Paliwal
(74) *Attorney, Agent, or Firm* — FisherBroyles, LLP

(57) ABSTRACT

The disclosed computer-implemented method for detecting security incidents may include (i) collecting, by a security server, security information describing security events detected on at least one client device, (ii) generating, based on the collected security information, a mathematical graph that includes a set of nodes designating machine-windows of data and a set of nodes designating detected security events, (iii) executing a random-walk-with-restart algorithm on the generated mathematical graph to sort the set of nodes designating machine-windows of data in terms of relevance to a set of ground truth nodes that indicate confirmed security threats, and (iv) performing a remedial security action to protect a user in response to detecting a candidate security threat based on sorting the set of nodes designating machine-windows of data by executing the random-walk-with-restart algorithm. Various other methods, systems, and computer-readable media are also disclosed.

20 Claims, 9 Drawing Sheets

Random Walk with Restart (RWR) Equation :

$$\vec{r} = (1-c)\widetilde{W}\vec{r} + c\vec{e}$$

Assuming that the graph has $n$ nodes, $\vec{r}$ : $1 \times n$ vector that contains RWR scores $\widetilde{W}$ : Column - normalized $n \times n$ adjacency matrix that contains $c$ : Restart probability, assumed to be 0.15

FIG. 5

Iteration 1:

$$\vec{r} = 0.85 \begin{bmatrix} 0 & 0.67 & 0 & 0 & 0 & 0 \\ 1 & 0 & 0.5 & 0 & 0 & 0 \\ 0 & 0.33 & 0 & 0.94 & 0 & 0 \\ 0 & 0 & 0.5 & 0 & 0.5 & 0 \\ 0 & 0 & 0 & 0.06 & 0 & 1 \end{bmatrix} \begin{bmatrix} 0.1\overline{6} \\ 0.1\overline{6} \\ 0.1\overline{6} \\ 0.1\overline{6} \\ 0.1\overline{6} \end{bmatrix} + 0.15 \begin{bmatrix} ( \\ 1 \\ ( \\ ( \\ ( \end{bmatrix}$$

Iteration 2:

$$\vec{r} = 0.85 \begin{bmatrix} 0 & 0.67 & 0 & 0 & 0 & 0 \\ 1 & 0 & 0.5 & 0 & 0 & 0 \\ 0 & 0.33 & 0 & 0.94 & 0 & 0 \\ 0 & 0 & 0.5 & 0 & 0.5 & 0 \\ 0 & 0 & 0 & 0.06 & 0 & 1 \end{bmatrix} \begin{bmatrix} 0.10 \\ 0.36 \\ 0.18 \\ 0.14 \\ 0.15 \end{bmatrix} + 0.15 \begin{bmatrix} ( \\ 1 \\ ( \\ ( \\ ( \end{bmatrix}$$

Iteration 3:

$$\vec{r} = 0.85 \begin{bmatrix} 0 & 0.67 & 0 & 0 & 0 & 0 \\ 1 & 0 & 0.5 & 0 & 0 & 0 \\ 0 & 0.33 & 0 & 0.94 & 0 & 0 \\ 0 & 0 & 0.5 & 0 & 0.5 & 0 \\ 0 & 0 & 0 & 0.06 & 0 & 1 \end{bmatrix} \begin{bmatrix} 0.21 \\ 0.31 \\ 0.21 \\ 0.14 \\ 0.07 \end{bmatrix} + 0.15 \begin{bmatrix} ( \\ 1 \\ ( \\ ( \\ ( \end{bmatrix}$$

*FIG. 6*

SYSTEMS AND METHODS FOR DETECTING SECURITY INCIDENTS

BACKGROUND

The increasing breadth of the security market makes it a challenge to differentiate between signal and noise across a wide swath of products in a MANAGED SECURITY SERVICES setting. For example, the challenge may include attempting to detect security incidents from two trillion event instances per month, of 72,000 event types per month, which are produced by 100 different security products.

Additionally, it is difficult to score a confidence level that estimates whether a security event indicates the occurrence of a security incident that justifies further investigation and attention. Event rankings are important because they provide insight into potential security threats and they can also form the basis for automated incident detection. Nevertheless, as discussed further below, some security solutions for identifying, detecting, and/or ranking security events and associated security incidents are not optimized along one or more dimensions. The instant disclosure, therefore, identifies and addresses a need for improved systems and methods for detecting security incidents.

SUMMARY

As will be described in greater detail below, the instant disclosure describes various systems and methods for detecting security incidents. In one example, a computer-implemented method for detecting security incidents may include (i) collecting, by a security server, security information describing security events detected on at least one client device, (ii) generating, based on the collected security information, a mathematical graph that includes a set of nodes designating machine-windows of data and a set of nodes designating detected security events, (iii) executing a random-walk-with-restart algorithm on the generated mathematical graph to sort the set of nodes designating machine-windows of data in terms of relevance to a set of ground truth nodes that indicate confirmed security threats, and (iv) performing a remedial security action to protect a user in response to detecting a candidate security threat based on sorting the set of nodes designating machine-windows of data by executing the random-walk-with-restart algorithm.

In one embodiment, the security server collects the security information from multiple distinct endpoint security products. In further embodiments, the random-walk-with-restart algorithm specifies a probability that a traversal of the mathematical graph will hop from a first node to a second node across a first edge of the mathematical graph that connects the first node to the second node. In one embodiment, the random-walk-with-restart algorithm further specifies a probability that a traversal of the mathematical graph will hop from the first node to a third node, instead of the second node, across a second edge of the mathematical graph that connects the first node to the third node.

In further embodiments, the mathematical graph specifies a respective weight for each of the first edge and the second edge. In some examples, the respective weight is identical for each edge connected to the first node. In additional examples, the respective weight is based on a respective measurement of confidence that a corresponding node indicates a security incident. In further examples, the random-walk-with-restart algorithm specifies a probability that a traversal of the mathematical graph will hop from the first node to a node in the set of ground truth nodes.

In some examples, the mathematical graph specifies, for each detected security event, an edge that connects the detected security event to a respective machine-window of data in which the security event was detected. In further examples, the remedial security action may include transmitting an electronic alert to a professional security analyst of a corporate security service.

In one embodiment, a system for implementing the above-described method may include (i) a collection module, stored in memory, that collects, as part of a security server, security information describing security events detected on at least one client device, (ii) a generation module, stored in memory, that generates, based on the collected security information, a mathematical graph that includes a set of nodes designating machine-windows of data and a set of nodes designating detected security events, (iii) an execution module, stored in memory, that executes a random-walk-with-restart algorithm on the generated mathematical graph to sort the set of nodes designating machine-windows of data in terms of relevance to a set of ground truth nodes that indicate confirmed security threats, (iv) a performance module, stored in memory, that performs a remedial security action to protect a user in response to detecting a candidate security threat based on sorting the set of nodes designating machine-windows of data by executing the random-walk-with-restart algorithm, and (v) at least one physical processor configured to execute the collection module, the generation module, the execution module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect, by a security server, security information describing security events detected on at least one client device, (ii) generate, based on the collected security information, a mathematical graph that includes a set of nodes designating machine-windows of data and a set of nodes designating detected security events, (iii) execute a random-walk-with-restart algorithm on the generated mathematical graph to sort the set of nodes designating machine-windows of data in terms of relevance to a set of ground truth nodes that indicate confirmed security threats, and (iv) perform a remedial security action to protect a user in response to detecting a candidate security threat based on sorting the set of nodes designating machine-windows of data by executing the random-walk-with-restart algorithm.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a block diagram of an example random-walk-with-restart algorithm.

FIG. 6 is a block diagram of an example of matrix multiplication operations to execute the random-walk-with-restart algorithm.

Figure 1:
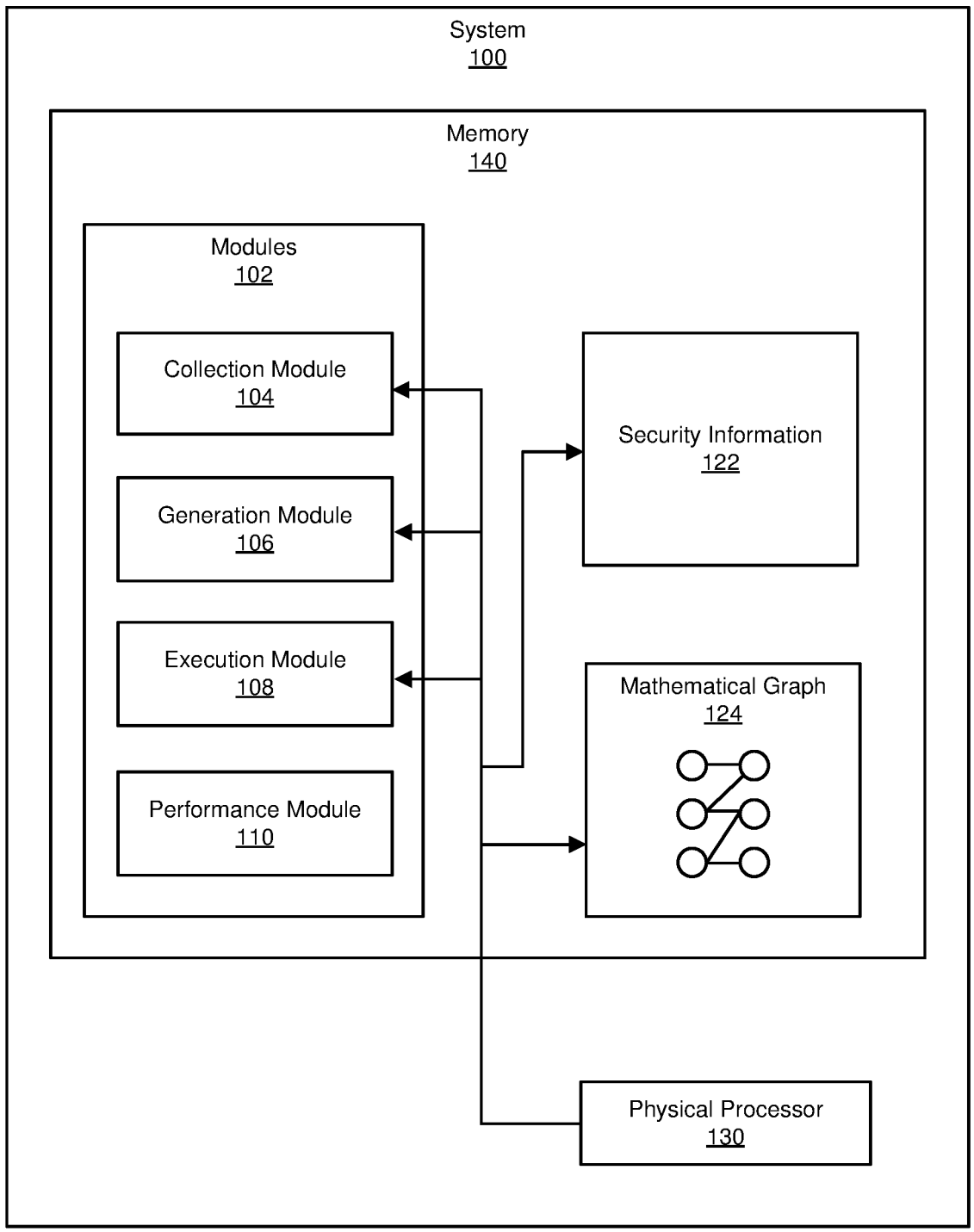
FIG. 1 is a block diagram of an example system for detecting security incidents.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting security incidents. As discussed further below, the disclosed systems and methods generally leverage a random-walk-with-restart algorithm to more effectively and efficiently identify, detect, and rank security events and corresponding security incidents. The disclosed systems and methods may improve upon related systems because the disclosed systems and methods may apply in the generic security alert setting, rather than applying specifically to file categorization. Additionally, the disclosed systems and methods may operate on a data set that omits categorizations of known good machines. In other words, the disclosed systems and methods may operate on a data set that only includes machines that have been categorized either as known bad or unknown, as discussed further below.

Figure 2:
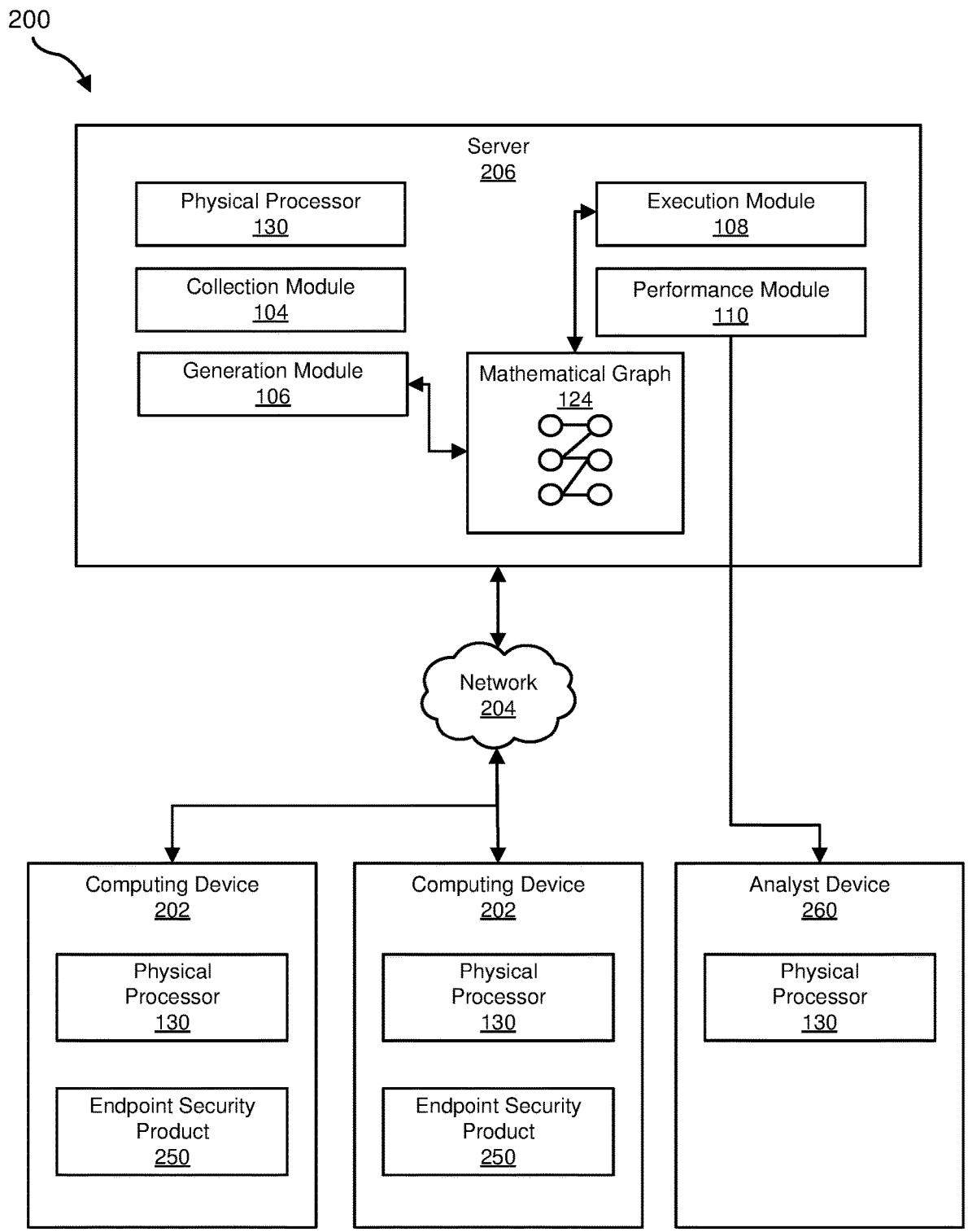
FIG. 2 is a block diagram of an additional example system for detecting security incidents.

The following will provide, with reference to FIGS. 1-2, detailed descriptions of example systems for detecting security incidents. Detailed descriptions of corresponding computer-implemented methods will also be provided in connection with FIGS. 3-7. In addition, detailed descriptions of an example computing system and network architecture capable of implementing one or more of the embodiments described herein will be provided in connection with FIGS. 8 and 9, respectively.

FIG. 1 is a block diagram of example system 100 for detecting security incidents. As illustrated in this figure, example system 100 may include one or more modules 102 for performing one or more tasks. For example, and as will be explained in greater detail below, example system 100 may include a collection module 104 that collects, as part of a security server, security information describing security events detected on at least one client device. Example system 100 may additionally include a generation module 106 that generates, based on the collected security information, a mathematical graph that includes a set of nodes designating machine-windows of data and a set of nodes designating detected security events.

Example system 100 may also include an execution module 108 that executes a random-walk-with-restart algorithm on the generated mathematical graph to sort the set of nodes designating machine-windows of data in terms of relevance to a set of ground truth nodes that indicate confirmed security threats. Example system 100 may additionally include a performance module 110 that performs a remedial security action to protect a user in response to detecting a candidate security threat based on sorting the set of nodes designating machine-windows of data by executing the random-walk-with-restart algorithm. As further shown in this figure, system 100 may additionally include security information 122 and a mathematical graph 124, as discussed further below. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting security incidents. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include two separate instances of a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to detect security incidents. For example, and as will be described in greater detail below, collection module 104 may collect, as part of a security server, such as server 206 shown in FIG. 2, security information, such as security information 122, describing security events detected on at least one client device, such as the two instances of computing device 202 shown in FIG. 2. As further shown in this figure, each instance of computing device 202 may further include an endpoint security product 250, which may provide security information 122 to collection module 104. Generation module 106 may generate, based on collected security information 122, mathematical graph 124 that includes a set of nodes designating machine-windows of data and a set of nodes designating detected security events. Execution module 108 may execute a random-walk-with-restart algorithm on the generated mathematical graph to sort the set of nodes designating machine-windows of data in terms of relevance to a set of ground truth nodes that indicate confirmed security threats. Performance module 110 may perform a remedial security action to protect a user in response to detecting a candidate security threat based on sorting the set of nodes designating machine-windows of data by executing the random-walk-with-restart algorithm. For example, performance module 110 may perform a remedial security action by transmitting an alert to an analyst device 260 that corresponds to an analyst of a third party security service.

Computing device 202 generally represents any type or form of computing device capable of reading computer-executable instructions. In some examples, computing device 202 may represent a client-side computing device, such as a desktop, laptop, or tablet, that is used by an employee of a corporate enterprise that is protected by a third-party security service, such as SYMANTEC. The third-party security service may manage server 206. Additional examples of computing device 202 include, without limitation, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of performing, or facilitating the performance of, method 300, as described further below. In some embodiments, server 206 may correspond to a backend security server of a third-party security service. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
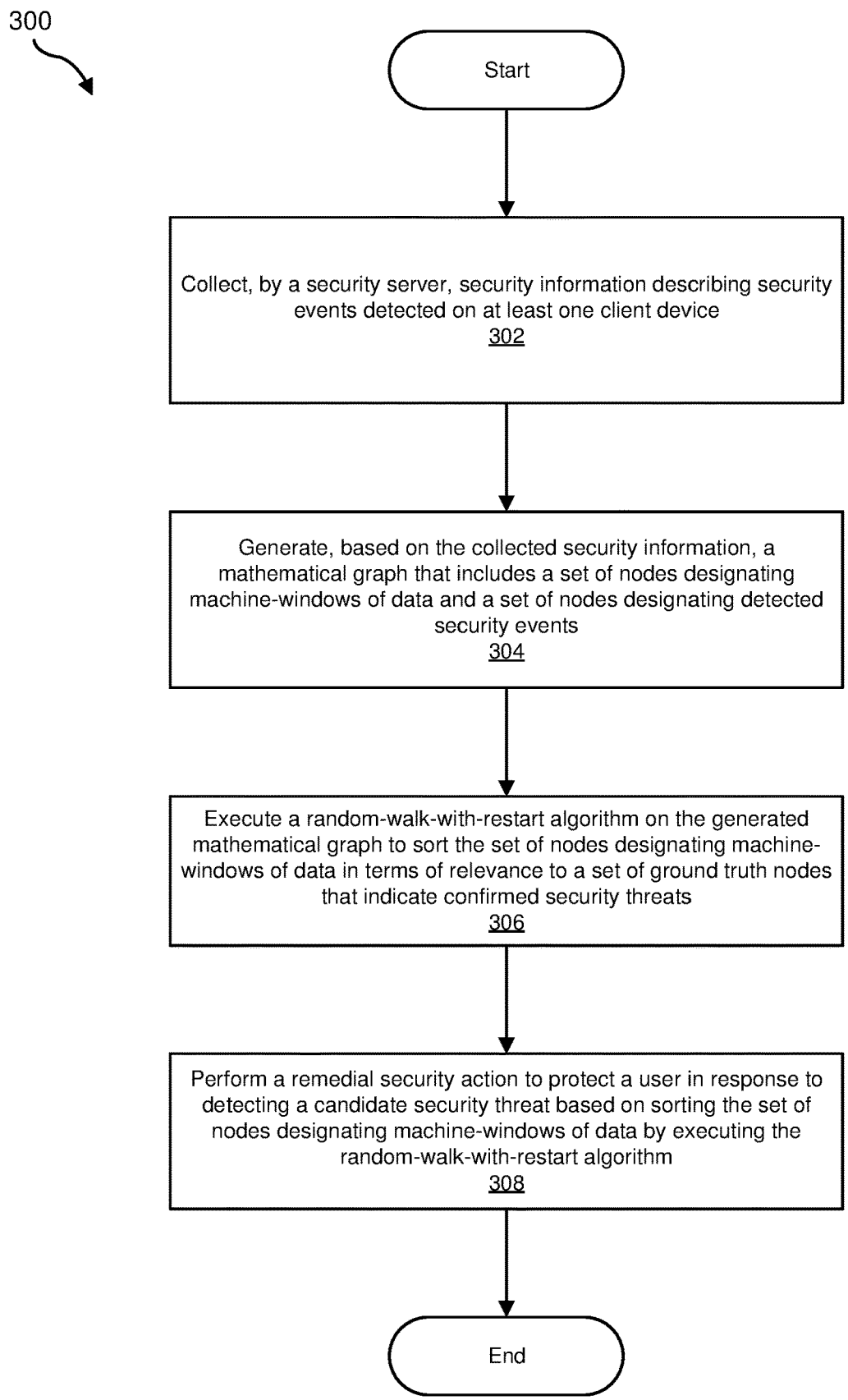
FIG. 3 is a flow diagram of an example method for detecting security incidents.

FIG. 3 is a flow diagram of an example computer-implemented method 300 for detecting security incidents. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may collect, as part of a security server, security information describing security events detected on at least one client device. For example, collection module 104 may, as part of server 206 in FIG. 2, collect security information 122 describing security events detected on at least one client device, such as an instance of computing device 202 shown in FIG. 2.

Collection module 104 may collect the security information in a variety of ways. In general, collection module 104 may collect the security information by simply inputting the security information or otherwise receiving the security information. For example, an analyst of a third party security service may input or provide the security information to collection module 104. In some examples, collection module 104 and/or the analyst may have collected the security information from a variety of different endpoint security products. For example, collection module 104 may poll different instances of each one of a multitude of different endpoint security products to collect the security information.

The security information collected by collection module 104 may take a variety of different forms. In general, the security information may include telemetry data collected from different instances of one or more endpoint security products. The telemetry data may specify values for different fields of relevant security data, such as values specifying a time, date, network address, machine identifier, customer identifier, and/or security event identifier or corresponding signature detection identifier.

At step 304, one or more of the systems described herein may generate, based on the collected security information, a mathematical graph that includes a set of nodes designating machine-windows of data and a set of nodes designating detected security events. For example, at step 304, generation module 106 may, as part of server 206, generate a mathematical graph that includes a set of nodes designating machine-windows of data and a set of nodes designating detected security events.

Figure 4:
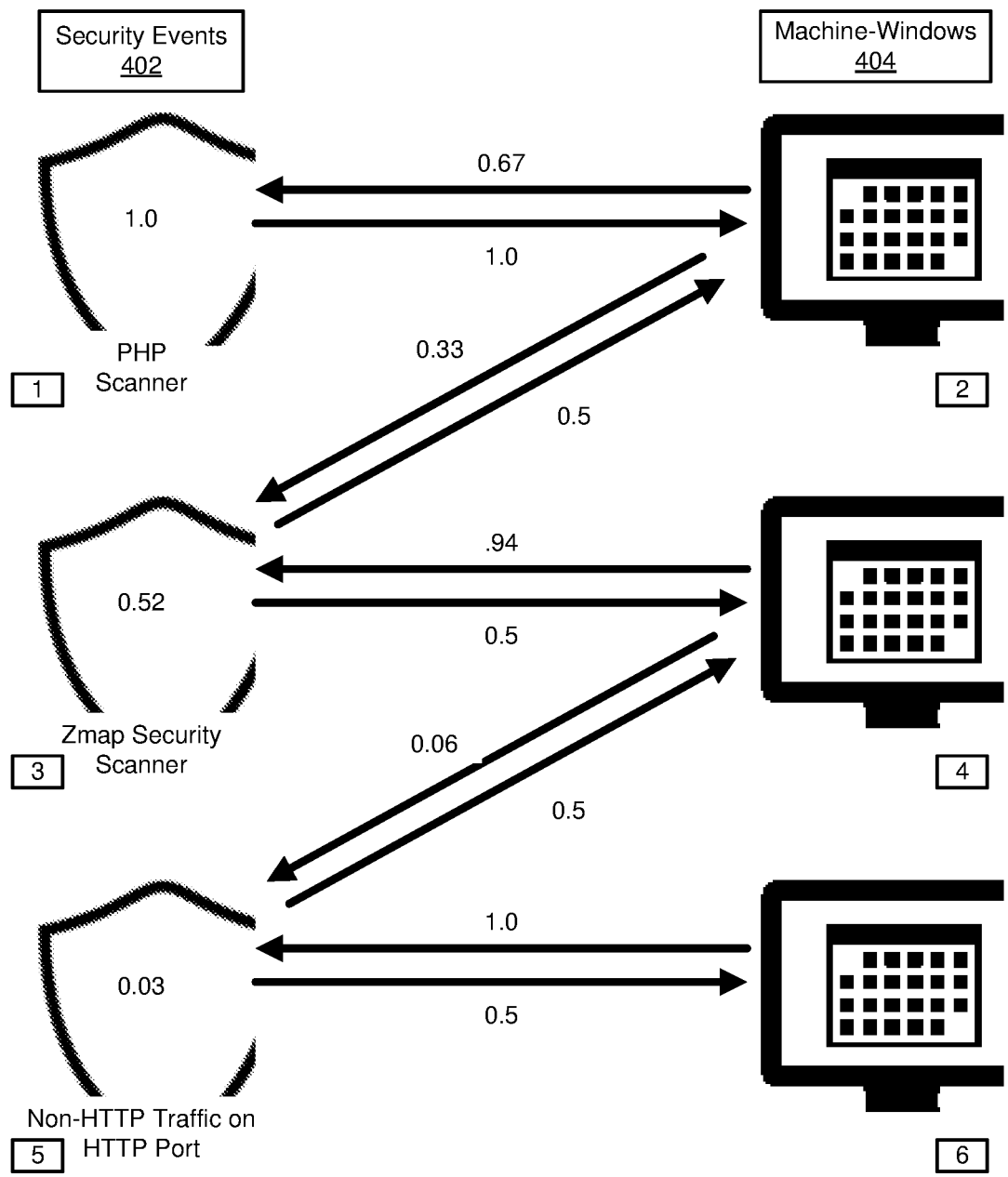
FIG. 4 is a block diagram of an example mathematical graph.
Figure 7:
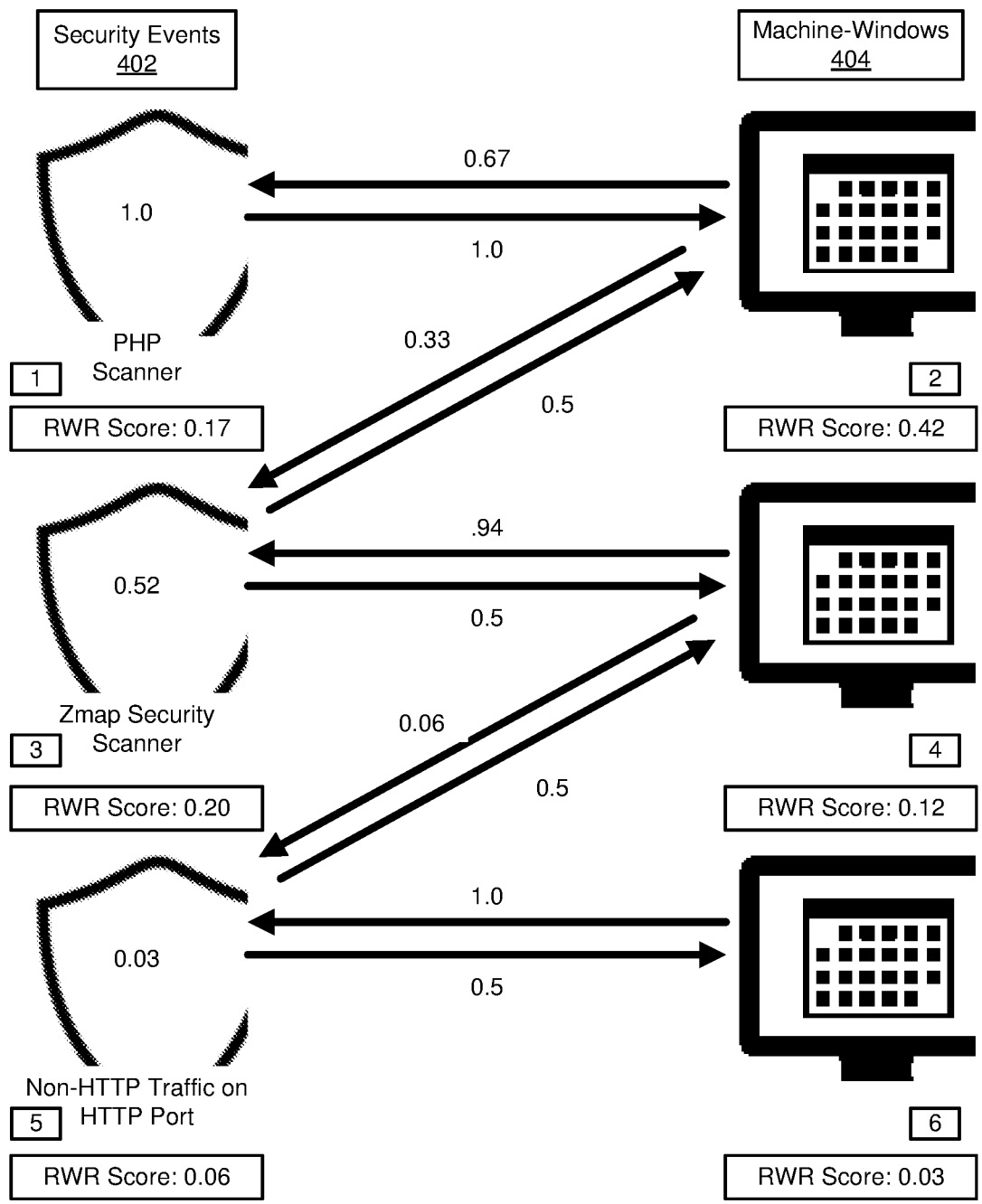
FIG. 7 is a block diagram of an updated example of the mathematical graph after execution of the random-walk-with-restart algorithm.

As used herein, the term "mathematical graph," generally refers to a weighted mathematical graph, as in FIGS. 4 and 7, that includes nodes and edges connecting various ones of the nodes, where the edges further specify corresponding weights. Additionally, or alternatively, the term "mathematical graph" may refer to a data structure that defines such a mathematical graph, as described above. The weights may indicate a relative probability of traversing from one node to another node along the corresponding edge rather than an alternative edge. For example, in FIGS. 4 and 7, the probability of traversing from node 2 to node 1 may be 67%, whereas the probability of traversing from node 2 to node 3 may be 33%, as further shown in these figures.

Additionally, as used herein, the term "security event" generally refers to any event that has been detected by a client-side or endpoint security product or a network security system (such as a firewall), or otherwise triggered a threat signature detection, regardless of whether the security event indicates a confirmed security incident. In other words, as used herein, the term "security event" refers to events that have been detected as potentially indicating a security incident, but which have not been confirmed to indicate a security incident. In contrast, as used herein, the term "security incident" generally refers to one or more events that have been confirmed to indicate a positive security threat, intrusion, attack, risk, infection, or other genuine risk of harm to a client or customer. More specifically, as used herein, some detected security events may occur in relation to actions that are benign as well as incidents that are malicious. Accordingly, the detected security events, by themselves, cannot confirm the positive presence of a security incident.

Generation module 106 may generate the mathematical graph in a variety of ways. In general, generation module 106 may generate the mathematical graph by extracting the data that defines the mathematical graph from the security information collected by collection module 104. Specifically, generation module 106 may identify a set of security events detected by corresponding security products. Examples of security events may include "PHP scanner," "Zmap security scanner," and "non-HTTP traffic on HTTP port," as further shown in FIG. 4. In some examples, the security information collected by collection module 104 may include thousands, millions, or billions of detected security events. Each security event may correspond to a signature detection detected by a corresponding security product, as further defined above.

In addition to extracting security events from the security information, generation module 106 may also extract one or more "machine-windows" of information. As used herein, the term "machine-window" generally refers to telemetry data collected by one or more security products on a particular protected client machine over a specified "window" of time. In some examples, the window of time may be 24 hours, or substantially 24 hours.

In general, generation module 106 may generate the mathematical graph by establishing two sets of nodes and also establishing one or more edges between various pairs of the nodes. The two sets of nodes may include a set of nodes designating machine-windows of data and a set of nodes designating detected security events. FIGS. 4 and 7 illustrate examples of such a mathematical graph, which includes security events 402 on a column on the left and machine-windows 404 on a column on the right, thereby forming a bipartite or two-column mathematical graph. In some examples, one or more of the nodes designating machine-windows of data may have been categorized as constituting, or indicating, a security incident, prior to execution of the random-walk-with-restart algorithm of step 306. For example, in FIG. 4, node 2 may indicate a security incident based on the detection of the "PHP scanner" security event, which may correspond to a reliable primary indicator of a security threat. Moreover, after execution of the random-walk-with-restart algorithm, one or more additional machine-windows of data may be revealed as indicating a security incident, as discussed further below in connection with step 308.

Additionally, generation module 106 may further generate the mathematical graph by establishing one or more edges between one or more pairs of nodes. For example, generation module 106 may establish at least one edge between one or more security events and a respective machine-window for a period of time in which the respective security event occurred. In some examples, generation module 106 may establish such an edge for each security event specified within the mathematical graph. Additionally, or alternatively, generation module 106 may establish two separate directed edges for each pair of detected security event and corresponding machine-window of data in which the security event was detected, as further shown in the example of FIG. 4.

Additionally, in some examples, generation module 106 may specify weights for one or more edges of the mathematical graph. For example, generation module 106 may establish uniform weights for each of multiple edges directed from a detected security event. For example, in FIG. 4, the two edges directed from node 3 for the "Zmap security scanner" security event each have a specified weight of 0.5.

Additionally, or alternatively, generation module 106 may also establish weights for one or more edges directed from a node for a machine-window of data. In some examples, these edges from nodes for machine-windows of data may be proportional to a measurement of confidence that each target security event triggered a corresponding security incident. In the example of FIG. 4, the mathematical graph may specify a confidence value of 1.0 for the security event of "PHP scanner" and a confidence value of "0.52" for the security event of "Zmap security scanner." These values may indicate that the former security event definitely indicates a security incident (with confidence level 1.0), and the latter security event indicates a security incident with a lower measurement of confidence (i.e., confidence level 0.52). Accordingly, the confidence level for the former security event is roughly twice the confidence level for the latter security event. Consequently, the edge from node 2 for the top right machine-window to node 1 for the "PHP scanner" security event has an edge weight of 0.67, which is twice the value of the edge weight from node 2 for the top right machine-window to node 3 for the "Zmap security scanner" security event. In general, the measurement of the confidence level specifying how likely a security event is to further indicate a security incident may be specified by a security program or product, and/or a security analyst.

At step 306, one or more of the systems described herein may execute a random-walk-with-restart algorithm on the generated mathematical graph to sort the set of nodes designating machine-windows of data in terms of relevance to a set of ground truth nodes that indicate confirmed security threats. For example, execution module 108 may, as part of server 206 in FIG. 2, execute a random-walk-with-restart algorithm on the generated mathematical graph 124 to sort the set of nodes designating machine-windows of data in terms of relevance to the set of ground truth nodes that indicate confirmed security threats.

As used herein, the term "ground truth nodes" generally refers to nodes that have been positively confirmed, within mathematical graph 124, as positively indicating security threats rather than potential or candidate security threats, as described further below. In the example of FIG. 4, node 2 for the topmost machine-window constitutes a ground truth node (and also constitutes the entire set of ground truth nodes in the mathematical graph of that figure). Accordingly, the set of ground truth nodes provides the original seed values on which the later computed random-walk-withrestart scores are computed, as described further below in connection with FIGS. 4-7. Furthermore, as used herein, the term "set" generally refers to a group having one or more members. In general, the ground truth nodes may include nodes that designate machine-windows of data that have been confirmed as indicating a security incident and/or nodes that designate security events that are reliable primary indicators of compromise. In some examples, the set of ground truth nodes may include only nodes that designate machine-windows of data that have been confirmed as indicating a security incident, because the additional (or alternative) inclusion of security event nodes, within the set of ground truth nodes, may decrease, rather than improve, the performance of the random-walk-with-restart algorithm in identifying candidate security threats.

As used herein, the term "random-walk-with-restart algorithm" generally refers to an algorithm that performs, or models, a random walk to traverse at least part of a corresponding mathematical graph. Additionally, the term "random-walk-with-restart algorithm" further refers to an algorithm that includes a "restart" option or function that returns a figurative particle, or traveler, that is traversing the mathematical graph back to an original node (e.g., a ground truth node) with a specified probability, as described further below. Moreover, as used herein, the term "random walk" generally refers to traversing a mathematical graph, in a step-by-step iterative fashion, in which each hop from one node to another node of the mathematical graph is governed by a probability distribution. In a pure random walk, the decision of which node to select from a previous node may be governed by a uniform probability distribution where each edge that connects the previous node to another node is equally weighted. In other random walks, the edges that connect one node to other nodes may have differing weights, as described further below in connection with FIGS. 4 and 7.

Additionally, as used herein, the phrase "sort the set of nodes designating machine-windows of data" generally refers to scoring the set of nodes designating machine-windows of data and ranking the members of this set of nodes in terms of their scores (i.e., their random-walk-with-restart scores, as described further below). In general, sorting the nodes designating machine-windows of data may be performed as part of a process of sorting all of the nodes within the mathematical graph, including the set of ground truth nodes.

Furthermore, as used herein, the phrase "relevance to a set of ground truth nodes" generally refers to the value measured by the output of the random-walk-with-restart algorithm, as described further below. In general, the random-walk-with-restart algorithm may measure a score for a respective node to indicate a likelihood that a figurative particle, or traveler, that traverses the mathematical graph according to the random-walk-with-restart algorithm will be found at the respective node after an infinite number of iterations.

Execution module 108 may execute the random-walk-with-restart algorithm in a variety of ways. In general, execution module 108 may execute any algorithm that satisfies the definition for the term "random-walk-with-restart algorithm" as set forth above. FIG. 5 further sets forth a specific example of such an algorithm.

As further outlined in FIG. 5, the algorithm may compute the values for a one-dimensional vector, which may correspond to the nodes of the mathematical graph, in terms of "r," which indicates the output scores of the algorithm (the scores from a previous iteration of the algorithm are inserted into the middle "r" of the multiplication/addition operation, as shown in FIG. 6, and the results of the multiplication/addition operation generate the next iteration of scores), "W," which is a normalized "n×n" adjacency matrix that contains edge weights (where the mathematical graph has "n" separate nodes), "c," which indicates the probability of restarting a traversal of the mathematical graph at an original or ground truth node, and "e," which is a one-dimensional vector that specifies which nodes correspond to restart nodes and which nodes do not, as further illustrated in FIG. 5. Regarding the vector "e," the example of FIG. 6 illustrates how node 2 has been designated as a ground truth node, and therefore a restart node, and all other nodes have not (the order of the nodes, from top to bottom, within vectors "e" and "r" corresponds to the numbering "1"-"6" shown in FIGS. 4 and 7). Regarding the matrix "W," the columns correspond to the source of an edge and the rows correspond to the destination of an edge. For instance, the first column in FIG. 6 represents the edges that originate from node 1 in the mathematical graph of FIG. 4. There is one such edge, which leads to node 2 of the mathematical graph, and the value in the corresponding cell is the weight of the edge (i.e., "1").

FIG. 6 further illustrates how, in the first iteration of the performance of the algorithm, the values for "r" have been set each to "0.16" (repeating), which corresponds to "⅙" or a uniform distribution between the six nodes of the mathematical graph of FIG. 4. In other words, in the absence of any further information or insight, the algorithm begins by assuming that the figurative particle or traveler (according to the graph traversal modeled by the algorithm) is initially equally likely to be found at any of the six separate nodes of the mathematical graph of FIG. 4.

FIG. 6 also illustrates the results of iterations 2 and 3 of performing the algorithm. As shown in the block diagrams for these respective iterations, the values of "r" continue to change, according to the addition and matrix multiplication operation that the algorithm defines, as set forth in FIG. 5. FIG. 6 also illustrates how the values for the vector "r," in the middle of the computation set forth in each iteration, are derived from the output or result of the previous iteration (i.e., the value of "0.10" on the right vector in iteration 1 is inserted into the corresponding position of the middle vector in iteration 2).

By way of example, FIG. 6 illustrates how the value of "0.10" in the resulting output vector "r" is derived from the following computation: 0.85 (i.e., 1 minus the reset probability "c," or "0.15"), multiplied by 0.67, multiplied by 0.16, and then added to the multiplication of 0.15 (i.e., the reset probability "c") and 0. In short, (0.85*0.67*0.16)+(0.15*0)=0.10 (rounded up). In these examples, the matrix "W" is multiplied by the vector "r" according to standard matrix multiplication (i.e., the value for each row of the output vector is equal to the sum of the multiples of the respective members of the corresponding row of the matrix by the respective members of the input matrix, moving left to right across the matrix row and top to bottom across the input vector). In these examples, the reset probability "c" may indicate a probability that a traversal of the mathematical graph will hop from one node to a node in the set of ground truth nodes (i.e., node 2 in FIG. 4).

In some examples, the random-walk-with-restart algorithm may generate a steady-state output vector. In other words, after a sufficiently large number of iterations, as described above in accordance with the computations outlined in FIG. 6, the values of "r" may converge on values that are stable within a predefined threshold of stability. The example of FIG. 6 is merely illustrative, and uses simply three separate iterations to generate output scores for the vector "r," which may further be used by performance module 110 to perform a remedial security action in accordance with step 308, as described further below. Specifically, these final values correspond to the vector on the right of iteration 3, as shown in FIG. 6 (0.17, 0.42, 0.20, 0.12, 0.06, and 0.03). Although this example uses final values derived after only three iterations of performing the algorithm outlined in FIGS. 5-6, this number of iterations is merely illustrative, or arbitrary, and other examples may use any other predefined, or suitable, number of iterations, an arbitrarily large number of iterations, and/or a number of iterations substantially larger than three. In some examples, execution module 108 may perform iterations of the algorithm until the resulting output values for the vector "r" satisfy a predefined measurement of stability or convergence, as further discussed above.

FIG. 7 shows an updated example of the mathematical graph of FIG. 4. This updated example includes an "RWR score," or random-with-restart score, for each of the six separate nodes of the mathematical graph. These scores correspond to the values for the vector "r" calculated according to the algorithm outlined in FIGS. 5-6. As further discussed above, this algorithm may score, and thereby rank, each node of the mathematical graph, including any ground truth node. In the example of FIGS. 4 and 7, node 2 may constitute the entire set of ground truth nodes.

As further shown in FIG. 7, the six separate nodes of the mathematical graph have been labeled with resulting output scores for the vector "r" from the third iteration previously outlined in FIG. 6 (i.e., scores 0.17, 0.42, 0.20, 0.12, 0.06, and 0.03). Accordingly, execution module 108 has scored, and ranked, the six separate nodes, thereby revealing a measurement of relevance, or distance, to the set of ground truth nodes (in the example of FIG. 7, node 2 is the single ground truth node). Accordingly, execution module 108 has ranked the six separate nodes in terms of these RWR scores (in this example, the ranking happens to be node 2 with score 0.42, node 3 with score 0.20, node 1 with score 0.17, node 4 with score 0.12, node 5 with score 0.06, and node 6 with score 0.03). Moreover, execution module 108 may further exclude the set of ground truth nodes (i.e., node 2), revealing a ranking of the remaining set of nodes including nodes representing machine-windows of data and nodes representing security events (i.e., node 3 with score 0.20, node 1 with score 0.17, node 4 with score 0.12, node 5 with score 0.06, and node 6 with score 0.03). Additionally, or alternatively, execution module 108 may also optionally exclude the nodes corresponding to security events 402 from the remaining set of nodes, thereby revealing a ranking of machine-windows 404 (i.e., node 2 with score 0.42, node 4 with score 0.12, and node 6 with score 0.03).

At step 308, one or more of the systems described herein may perform a remedial security action to protect a user in response to detecting a candidate security threat based on sorting the set of nodes designating machine-windows of data by executing the random-walk-with-restart algorithm. For example, performance module 110 may, as part of server 206 in FIG. 2, perform a remedial security action to protect a user in response to detecting a candidate security threat based on sorting the set of nodes designating machine-windows of data by executing the random-walk-with-restart algorithm.

As used herein, the term "remedial security action" generally refers to any action that protects, or potentially protects, a user from an identified or detected security threat, as discussed further below. Illustrative examples of the remedial security action include warning or alerting the user, warning or alerting a security analyst of a corporate security service that executed the random-walk-with-restart algorithm, enabling or heightening one or more security measures or features, and/or disabling, deleting, quarantining, inhibiting, throttling, and/or turning off one or more devices, nodes, programs, and/or features. In one example, performance module 110 may perform the remedial security action by automatically, or autonomously, reporting the candidate security threat to a security analyst of a security vendor that manages a server, such as server 206, which executed the random-walk-with-restart algorithm, as further outlined above in connection with FIGS. 4-7. In some examples, performance module 110 may itself, automatically or autonomously, perform one or more of these remedial security actions. In other examples, performance module 110 may simply trigger, initiate, or facilitate one or more of these remedial security actions (and the triggering, initiating, or facilitating may itself constitute a remedial security action, as that term is defined herein).

Additionally, the term "candidate security threat" generally refers to any candidate or potential security threat identified, revealed, and/or highlighted by the performance of step 306, as further discussed above. In other words, a candidate security threat may correspond to either a detected security event and/or a machine window that has been highlighted, according to any predefined threshold or measurement, by execution of the random-walk-with-restart algorithm, thereby indicating that the detected security event and/or machine window poses a security threat that was not previously understood or ascertained until execution of this algorithm.

Performance module 110 may perform a remedial security action in a variety of ways. In general, performance module 110 may automatically, or autonomously, perform the security action in response to detection of the candidate security threat. Performance module 110 may detect the candidate security threat by identifying one or more nodes within the mathematical graph that satisfy a threshold, or metric, in terms of the RWR score, as further outlined above. The threshold may be predefined prior to execution of the algorithm. Alternatively, the threshold may be defined dynamically in terms of results of execution of this algorithm.

In some examples, the threshold may define an absolute threshold in comparison to an absolute RWR score. In the example of FIG. 7, an absolute threshold of "0.15" may identify nodes 1, 2, and 3 as indicating a candidate security threat, because the RWR scores of 0.17, 0.42, and 0.20 are greater than (or, alternatively, greater than or equal to) 0.15, whereas the RWR scores for nodes 3-6 do not satisfy this threshold. Additionally, or alternatively, the threshold may define a top fraction, or proportion, of a set of scored nodes within the mathematical graph. In the example of FIG. 7, a threshold of 0.33 would identify nodes 2 and 3 as indicating a candidate security threat, because nodes 2 and 3 fit within the top 33% of the mathematical graph when ranked by RWR score. Furthermore, in some examples, the threshold may define a top number, in absolute terms, of nodes within a set of scored nodes. In the example of FIG. 7, a threshold of the top two nodes, within the mathematical graph, may identify nodes 2 and 3 as indicating corresponding candidate security threats, because these two nodes have the highest RWR scores in the mathematical graph. In these examples, performance module 110 has applied the threshold to all of the nodes of the mathematical graph, but in other examples, performance module 110 may apply the threshold to a smaller subset, such as the subset formed by machine-windows 404, as further discussed above.

As discussed further above, the disclosed systems and methods generally leverage a random-walk-with-restart algorithm to more effectively and efficiently identify, detect, and rank security events and corresponding security incidents. The disclosed systems and methods may improve upon related systems because the disclosed systems and methods may apply in the generic security alert setting, rather than applying specifically to file categorization. Additionally, the disclosed systems and methods may operate on a data set that omits categorizations of known good machines. In other words, the disclosed systems and methods may operate on a data set that only includes machines that have been categorized either as known bad or unknown.

Figure 8:
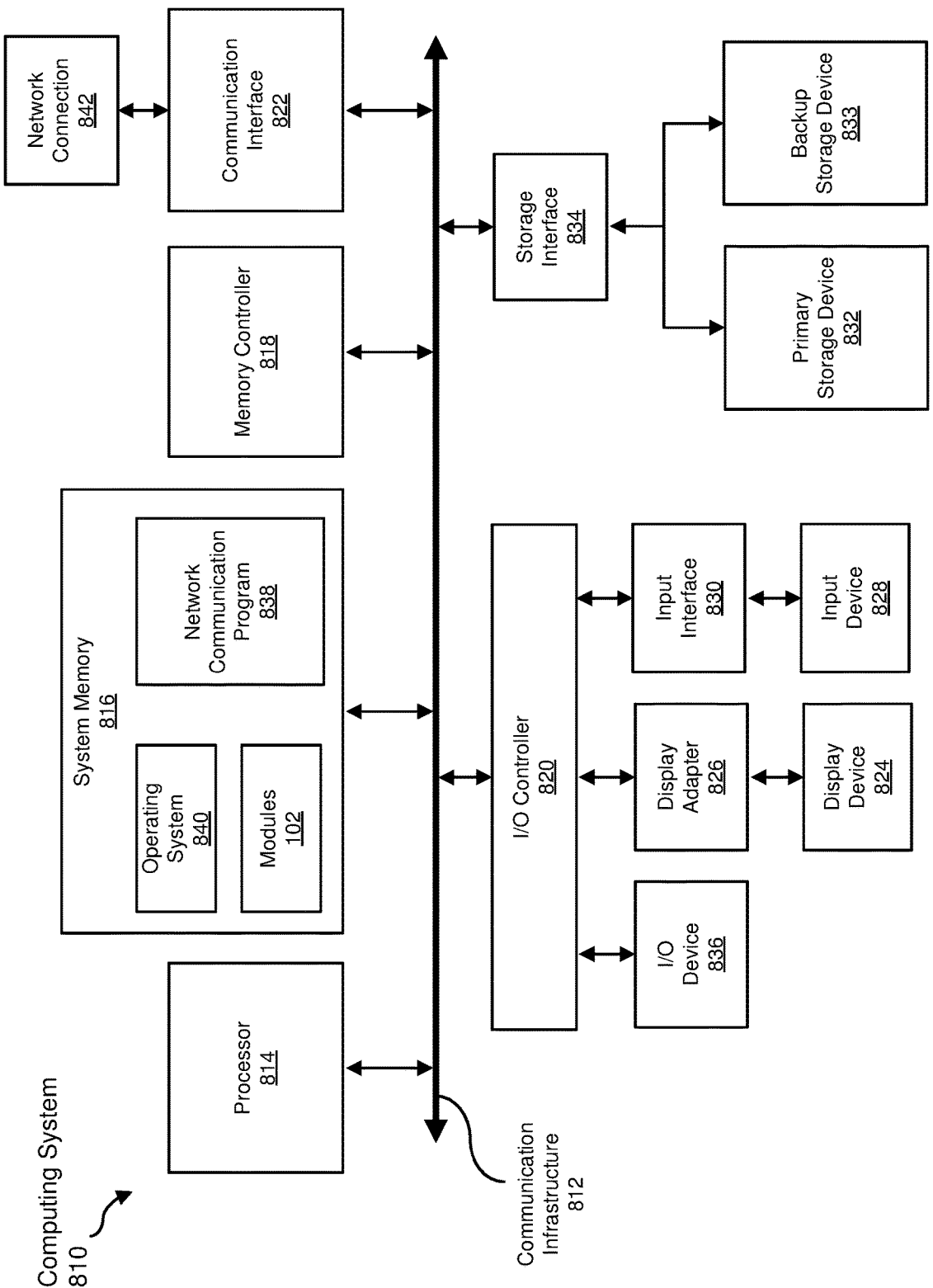
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface

822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
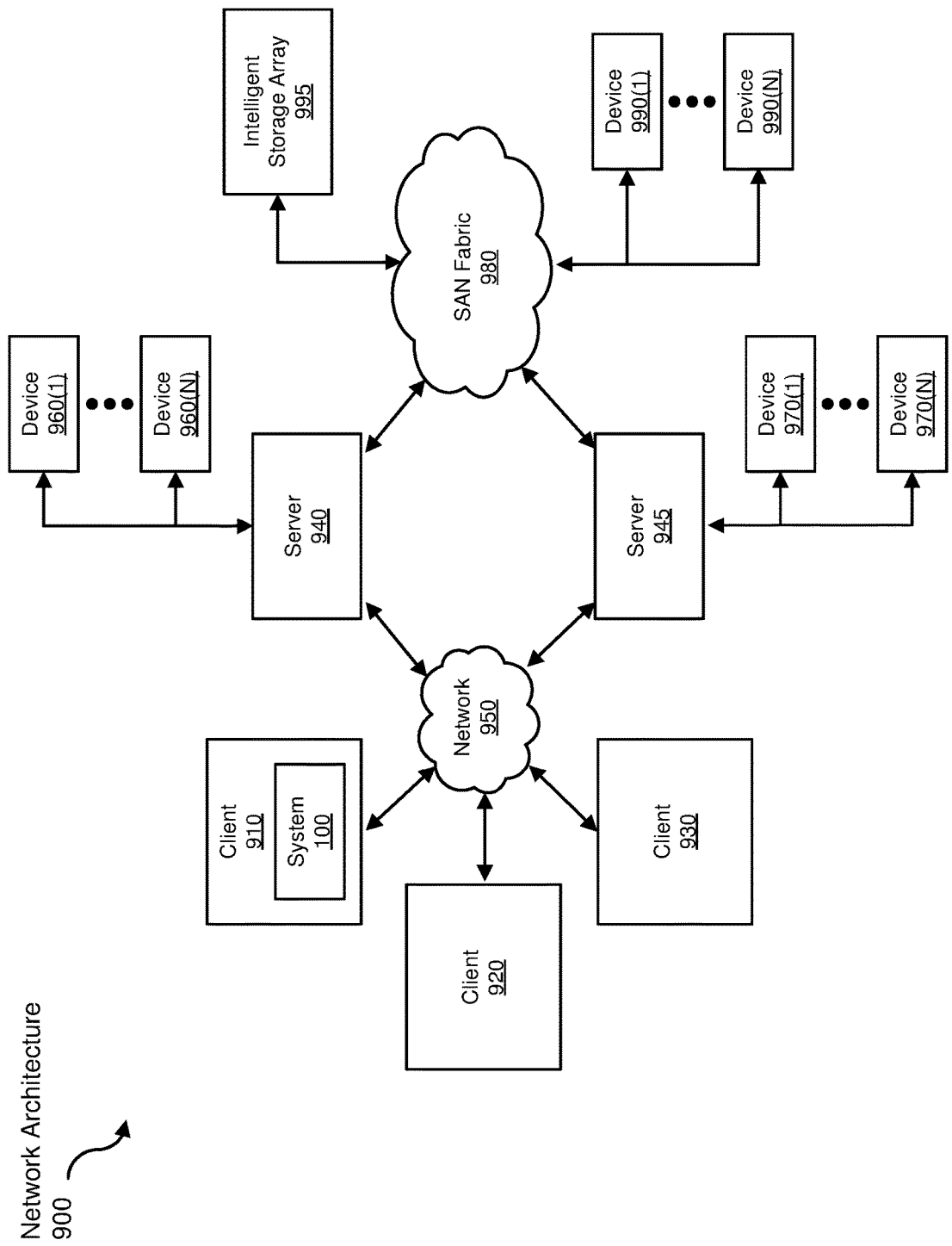
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for detecting security incidents.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive security information to be transformed, transform the security information by sorting output scores, as further described above, output a result of the transformation to a network packet or output device, and use the result of the transformation to improve the detection of security incidents. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security incidents, at least a portion of the method being performed by a computing device comprising at least one processor, the method comprising:
   collecting, by a security server, security information describing security events detected on at least one client device;
   generating, based on the collected security information, a mathematical graph that comprises:
      a set of nodes designating machine-windows of data; and
      a set of nodes designating detected security events;
   executing a random-walk-with-restart algorithm on the generated mathematical graph to sort the set of nodes designating machine-windows of data in terms of relevance to a set of ground truth nodes that indicate confirmed security threats; and performing a remedial security action to protect a user in response to detecting a candidate security threat based on sorting the set of nodes designating machine-windows of data by executing the random-walk-with-restart algorithm;

wherein the random-walk-with-restart algorithm specifies a probability that a traversal of the mathematical graph will hop from a first node to a node in the set of ground truth nodes.

2. The computer-implemented method of claim 1, wherein the security server collects the security information from multiple distinct endpoint security products.

3. The computer-implemented method of claim 1, wherein the random-walk-with-restart algorithm specifies a probability that a traversal of the mathematical graph will hop from a first node to a second node across a first edge of the mathematical graph that connects the first node to the second node.

4. The computer-implemented method of claim 3, wherein the random-walk-with-restart algorithm further specifies a probability that a traversal of the mathematical graph will hop from the first node to a third node, instead of the second node, across a second edge of the mathematical graph that connects the first node to the third node.

5. The computer-implemented method of claim 4, wherein the mathematical graph specifies a respective weight for each of the first edge and the second edge.

6. The computer-implemented method of claim 5, wherein the respective weight is identical for each edge connected to the first node.

7. The computer-implemented method of claim 5, wherein the respective weight is based on a respective measurement of confidence that a corresponding node indicates a security incident.

8. The computer-implemented method of claim 1, wherein the random-walk-with-restart algorithm is governed by a uniform probability distribution.

9. The computer-implemented method of claim 1, wherein the mathematical graph specifies, for each detected security event, an edge that connects the detected security event to a respective machine-window of data in which the security event was detected.

10. The computer-implemented method of claim 1, wherein the remedial security action comprises transmitting an electronic alert to a professional security analyst of a corporate security service.

11. A system for detecting security incidents, the system comprising:
  a collection module, stored in memory, that collects, as part of a security server, security information describing security events detected on at least one client device;
  a generation module, stored in memory, that generates, based on the collected security information, a mathematical graph that comprises:
    a set of nodes designating machine-windows of data; and
    a set of nodes designating detected security events;
  an execution module, stored in memory, that executes a random-walk-with-restart algorithm on the generated mathematical graph to sort the set of nodes designating machine-windows of data in terms of relevance to a set of ground truth nodes that indicate confirmed security threats;
  a performance module, stored in memory, that performs a remedial security action to protect a user in response to detecting a candidate security threat based on sorting the set of nodes designating machine-windows of data by executing the random-walk-with-restart algorithm; and
  at least one physical processor configured to execute the collection module, the generation module, the execution module, and the performance module;
  wherein the random-walk-with-restart algorithm specifies a probability that a traversal of the mathematical graph will hop from a first node to a node in the set of ground truth nodes.

12. The system of claim 11, wherein the security server collects the security information from multiple distinct endpoint security products.

13. The system of claim 11, wherein the random-walk-with-restart algorithm specifies a probability that a traversal of the mathematical graph will hop from a first node to a second node across a first edge of the mathematical graph that connects the first node to the second node.

14. The system of claim 13, wherein the random-walk-with-restart algorithm further specifies a probability that a traversal of the mathematical graph will hop from the first node to a third node, instead of the second node, across a second edge of the mathematical graph that connects the first node to the third node.

15. The system of claim 14, wherein the mathematical graph specifies a respective weight for each of the first edge and the second edge.

16. The system of claim 15, wherein the respective weight is identical for each edge connected to the first node.

17. The system of claim 15, wherein the respective weight is based on a respective measurement of confidence that a corresponding node indicates a security incident.

18. The system of claim 11, wherein the random-walk-with-restart algorithm is governed by a uniform probability distribution.

19. The system of claim 11, wherein the mathematical graph specifies, for each detected security event, an edge that connects the detected security event to a respective machine-window of data in which the security event was detected.

20. A non-transitory computer-readable medium comprising one or more computer-readable instructions that, when executed by at least one processor of a computing device, cause the computing device to:
  collect, by a security server, security information describing security events detected on at least one client device;
  generate, based on the collected security information, a mathematical graph that comprises:
    a set of nodes designating machine-windows of data; and
    a set of nodes designating detected security events;
  execute a random-walk-with-restart algorithm on the generated mathematical graph to sort the set of nodes designating machine-windows of data in terms of relevance to a set of ground truth nodes that indicate confirmed security threats; and
  perform a remedial security action to protect a user in response to detecting a candidate security threat based on sorting the set of nodes designating machine-windows of data by executing the random-walk-with-restart algorithm;
  wherein the random-walk-with-restart algorithm specifies a probability that a traversal of the mathematical graph will hop from a first node to a node in the set of ground truth nodes.

* * * * *